(12) United States Patent
Seger et al.

(10) Patent No.: US 9,973,667 B2
(45) Date of Patent: May 15, 2018

(54) CAMERA HOUSING FOR ADJUSTING AN OPTICAL SYSTEM

(71) Applicant: Robert Bosch GmbH, Stuttgart (DE)

(72) Inventors: Ulrich Seger, Leonberg-Warmbronn (DE); Nikolai Bauer, Moeglingen (DE); Dmitriy Aranovich, Pliezhausen (DE); Peter Diesel, Bad Hindelang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/193,898

(22) Filed: Jun. 27, 2016

(65) Prior Publication Data

US 2017/0006197 A1    Jan. 5, 2017

(30) Foreign Application Priority Data

Jun. 30, 2015    (DE) .......................... 10 2015 212 123

(51) Int. Cl.
*H04N 5/225* (2006.01)
*G03B 17/02* (2006.01)

(52) U.S. Cl.
CPC .......... *H04N 5/2253* (2013.01); *G03B 17/02* (2013.01); *H04N 5/2252* (2013.01); *H04N 5/2257* (2013.01)

(58) Field of Classification Search
CPC .. H04N 5/2253; H04N 5/2257; H04N 5/2252; G03B 17/02
See application file for complete search history.

(56) References Cited

U.S. PATENT DOCUMENTS

2004/0239793 A1* 12/2004 Lu ........................ H04N 5/2253
                                                                           348/340
2015/0326756 A1* 11/2015 Knutsson ............ H04N 5/2251
                                                                           348/148

FOREIGN PATENT DOCUMENTS

| DE | 10344767 A1 | 5/2005 |
|---|---|---|
| DE | 102014211879 A1 | 1/2016 |
| EP | 3051342 A1 | 8/2016 |
| JP | 2004297282 A | 10/2004 |
| JP | 2015045711 A | 3/2015 |
| WO | 2009116367 A1 | 9/2009 |

* cited by examiner

*Primary Examiner* — Padma Haliyur
(74) *Attorney, Agent, or Firm* — Norton Rose Fulbright US LLP; Gerard Messina

(57) ABSTRACT

A housing for mounting a component that includes an image sensor, a fixed installation space being provided in the interior of the housing for accommodating at least one optical component. The housing has at least one outer receiving recess that is spatially separate from the interior of the housing. This outer receiving recess is provided for receiving at least one positioning element in a way that allows the positioning element to define a support plane relative to the housing, and the component including the image sensor to be placed on the positioning element, so that the component including the image sensor resides in the defined support plane. In this case, the component including the image sensor may be placed in the defined support plane in a way that does not allow any direct contact between the component that includes the image sensor, and the housing.

12 Claims, 4 Drawing Sheets

501

502

CAMERA HOUSING FOR ADJUSTING AN OPTICAL SYSTEM

CROSS REFERENCE

The present application claims the benefit under 35 U.S.C. § 119 of German Patent Application No. DE 102015212123.2 filed on Jun. 30, 2015, which is expressly incorporated herein by reference in its entirety.

FIELD

The present invention relates to a camera housing, respectively a device for mounting a component that includes an image sensor.

A configuration of a conventional optical assembly uses a lens system initially installed in a separate housing. Subsequently thereto, in response to a rotational movement or screw fastening, for example, this housing is inserted into another housing upon which an image sensor has already been fixed in position. In this connection, the distance of the optical system to the image sensor is modified by rotating the housing containing the lens system relative to the housing containing the image sensor.

SUMMARY

In accordance with the present invention, a housing is described for mounting a component that includes an image sensor, a fixed installation space for accommodating at least one optical component being provided in the interior of the housing. The present invention provides that the housing have at least one outer receiving recess that is spatially separate from the interior of the housing. This outer receiving recess is provided for receiving at least one positioning element in a way that allows the positioning element to define a support plane relative to the housing and the component including the image sensor to be placed on the positioning element, so that the component including the image sensor resides in the defined support plane. In this case, the component including the image sensor may be placed in the defined support plane in a way that does not allow any direct contact between the component that includes the image sensor, and the housing.

This housing advantageously permits at least one positioning element to be mounted thereon via the at least one outer receiving recess. The at least one positioning element may be mounted in a way that allows the mounting thereof relative to the housing to define a supporting surface. The component including the image sensor is positioned in this plane by the placement of the receiving element including the image sensor on the at least one positioning element. The plane is defined by the at least one positioning element and is not necessarily restricted by the shape or orientation of the housing. Considered separately, it is not necessary that the housing geometry be suited for direct placement of the component including the image sensor.

A component that includes an image sensor is understood here to refer to all components which have at least one image sensor as a constituent part. The component does not necessarily enclose the image sensor here; it may be fastened to the edge of the image sensor. Supporting structures, upon which an image sensor may be mounted, are explicitly meant here; it also being possible, however, for the component to be exclusively an image sensor.

Since the outer receiving recess is mounted separately from the interior of the housing, within which at least one optical component may likewise be mounted, it is not possible for any particles to be released and thereby soil the interior of the housing upon attachment of the at least one positioning element. Since the image sensor is likewise able to contact the interior of the housing, a dirt contamination of the image sensor is thereby likewise avoided.

The fixed installation space for at least one optical component in the interior of the housing makes it possible for optical components, such as lenses, diaphragms, seals, and spacer elements, to be placed directly in the housing, so they do not require a separate and/or additional housing.

Another variant provides that the housing feature at least three outer receiving recesses, in particular for receiving pin-shaped positioning elements.

The advantage derived by using three outer receiving recesses is that it is likewise possible to attach three positioning elements. If the positioning elements are pin-shaped, for example, and/or do not have a plane surface on the side on which the component including the image sensor is to be placed, but are rounded, for example, a plane may be defined by at least three positioning elements.

Another preferred specific embodiment of the housing provides that the at least one outer receiving recess be realized by a cavity and/or by a through-extending opening at a location of the housing.

Here the advantage is derived that at least one positioning element may be introduced and/or inserted into the receiving recess. A readily realizable plug-in system is thereby derived, it being possible for the position of the positioning element to be fixed in the outer receiving recess by press fitting, for example. This type of attachment is possible, both in the variant as a cavity, a cavity being understood to be a hollowed-out location, recess or indentation, as well as in the variant as a through-extending opening.

The present invention also relates to a device for mounting a component including an image sensor that is composed of a housing, a fixed installation space for accommodating at least one optical component being provided in the interior of the housing, and at least one positioning element being provided. Generally, the present invention provides that the housing have at least one outer receiving recess that is spatially separate from the interior of the housing. This receiving recess is provided for receiving at least one positioning element in a way that allows the positioning element to define a support plane relative to the housing, and the component including the image sensor to be placed on the positioning element, so that the component including the image sensor resides in the defined support plane. Here, the component including the image sensor may be placed in the defined support plane in a way that does not allow any direct contact between the component including the image sensor, and the housing.

This device may have the advantage that the at least one positioning element makes it possible to define a surface upon which the component including the image sensor may be placed, so that the image sensor resides in a defined plane. The plane may be defined by the at least one positioning element as a function of an optical component installed in the interior of the housing in a way that defines a support plane that brings the image sensor into a preferred position relative to the optical component following placement of the component including the image sensor.

In one optional design variant, the device additionally includes at least one optical component that is fixedly mounted in the interior of the housing at the fixed installation space provided for at least one optical component.

The advantage of an already permanently installed optical component is that tolerances related to the installation of optical systems are reduced. This also permits better standardization of camera systems since less play occurs during installation.

One preferred design variant of the device permits the use of three positioning elements, in particular of three pin-shaped positioning elements, in particular having rounded ends.

By using three support points that may be provided by the three positioning elements, this specific embodiment advantageously makes it possible for a unique plane to be defined, upon which the component including the image sensor may be placed.

In this case, the positioning elements may be realized in a pin shape, for example, and have rounded ends on the side facing the component including the image sensor. This specific embodiment has the advantage that, on the one hand, the elements are very simple to manufacture, that pin-shaped elements are readily introducible into a receiving recess; and that, because of the rounded corners, the angular relationship between the positioning element and the component that includes the image sensor does not have any influence.

The angular relationship has no effect because a plane supporting surface may be attached in any desired manner to a spherical surface. In this case, the component including the image sensor has the plane supporting surface.

Another specific embodiment provides that the position of the at least one positioning element be variable in response to a movement relative to the outer receiving recess.

Here, the advantage is derived that the positioning elements are initially not required to have defined dimensions adapted to the shape of the receiving recess in a way that allows the combination of the outer receiving recess and the positioning element to establish the defined plane without an individual placement relative to each other.

Since the positioning elements may be moved relative to the outer receiving recess, different planes may be defined for placement of the component including the image sensor with the aid of at least one predefined outer receiving recess and at least one positioning element.

Another specific embodiment provides that the device additionally include the component including the image sensor, the component including the image sensor featuring a plane supporting surface, where the contact to the at least one positioning element is provided, in particular a plane supporting surface for laterally positioning the image sensor.

This device provides the advantage that the component including the image sensor be laterally displaceable by the plane supporting surface on the component including the image sensor, whereby the image sensor is movable to a preferred position.

The present invention also provides a device for attaching a component that includes an image sensor and that is formed by a housing; a fixed installation space for accommodating at least one optical component being provided in the interior of the housing, and at least one positioning element being provided. It is a feature of this device that at least one positioning element is attached to the housing outside of the interior in a way that allows a support plane to be defined by adapting the orientation of the at least one positioning element relative to the housing, and the component that includes the image sensor to be positioned within this support plane by the placement thereof onto the at least one positioning element.

This device may provide the advantage that the at least one positioning element is already mounted on the housing, thereby obviating the need for any separate positioning elements.

Since the positioning element is fixed to the housing, changing the support plane requires adapting the orientation of the at least one positioning element by bending or deforming it, for example. In this case, the orientation denotes the position of the region of the positioning element that is provided for the placement of the component including the image sensor, relative to the housing.

In one preferred specific embodiment of this device, the support plane may be altered by removing material from the at least one positioning element.

Here the advantage is derived that the at least one positioning element may initially be configured to be significantly larger than is necessary for defining a preferred support plane. By removing material from the at least one positioning element, the support plane may subsequently be precisely adapted and defined.

In accordance with the present invention, a method is also described for mounting a component that includes an image sensor. The device used for the method is composed of a housing, a fixed installation space being provided in the interior of the housing for accommodating at least one optical component, as well as at least one optical component that is fixed in position in the housing, at least one positioning element, that is either mounted separately from the interior of the housing and/or may be mounted at at least one outer receiving recess of the housing that is separate from the interior of the housing, and a component that includes an image sensor. The method includes the following steps:

measuring the optical properties of the at least one optical component;

on the basis of the measurement, designating a preferred image plane in which the image sensor is to be mounted relative to a mechanical reference on the housing and/or the optical component;

adapting the at least one positioning element in a way that allows a support plane to be defined, taking into consideration the preferred image plane and the component including the image sensor; and/or mounting the at least one positioning element on the at least one outer receiving recess in a way that allows a support plane to be defined, taking into consideration the preferred image plane and the component including the image sensor;

mounting the component that includes the image sensor on the at least one positioning element in a way that allows the image sensor to reside in the preferred image plane.

The advantages of the method reside in that the position of the component including the image sensor may be adapted with the aid of the at least one positioning element in the context of an already clearly defined position and clearly defined optical properties of a lens or lens system.

Since the optical components are already permanently installed in the housing, it is no longer necessary to adapt the positions thereof.

Current analysis methods, such as "active alignment," for example, are used for measuring the optical properties of the at least one optical component. The preferred image plane is likewise determined using this method, the preferred image plane being understood to refer to the plane in which the desired object in the object field may be optimally imaged onto the image sensor. This plane does not necessarily need to be plane-parallel to any surface of the housing.

The method provides for two alternative procedures that are dependent on the housing that is used. If the housing is used where at least one positioning element is already mounted spatially separately from the interior of the housing, the support plane is defined by adapting the at least one positioning element, for example, by removing material.

If the housing that has at least one outer receiving recess is used, then the support plane is able to be defined by mounting the at least one positioning element at the at least one outer receiving recess. This is accomplished, for example, by moving the positioning element relative to the outer receiving recess.

By defining the support plane using the at least one positioning element, the component including the image sensor is readily mountable on the at least one positioning element, so that the image sensor subsequently resides in the preferred image plane.

In an optional additional method step, the component including the image sensor is joined to the at least one positioning element in a material-to-material bond, preferably via an adhesive bond.

Here, the advantage is derived that all components are hereby bonded to one another and thereby fixed in position. Instead of adhesive bonding, other methods may also be used, such as a spot welding or a method where the materials are initially heated and produce a fixed connection during the subsequent cooling.

In an optional further method step, the component including the image sensor is joined to the housing in a way that allows the intermediate space between the housing and the component including the image sensor to be closed by form-locking engagement and/or by a material-to-material bond, preferably via an adhesive bond.

Here, an advantage is derived that the housing is sealed with the aid of the component including the image sensor. No particles that could influence the optical path are able to hereby penetrate into the interior of the housing. Moreover, a fixed association and a fixed positioning are attained for all of the components relevant to the optical properties of the system. In place of the adhesive bond, other methods for protecting the interior from dirt contamination are also conceivable. These include, for example, using silicone seals or deforming the component or the housing including the image sensor, or using a welding process.

Other details, features, feature combinations, advantages and effects based on the present invention are derived from the dependent claims, as well as from the following description of preferred exemplary embodiments of the present invention, and from the figures.

DETAILED DESCRIPTION OF EXAMPLE EMBODIMENTS

Figure 1:
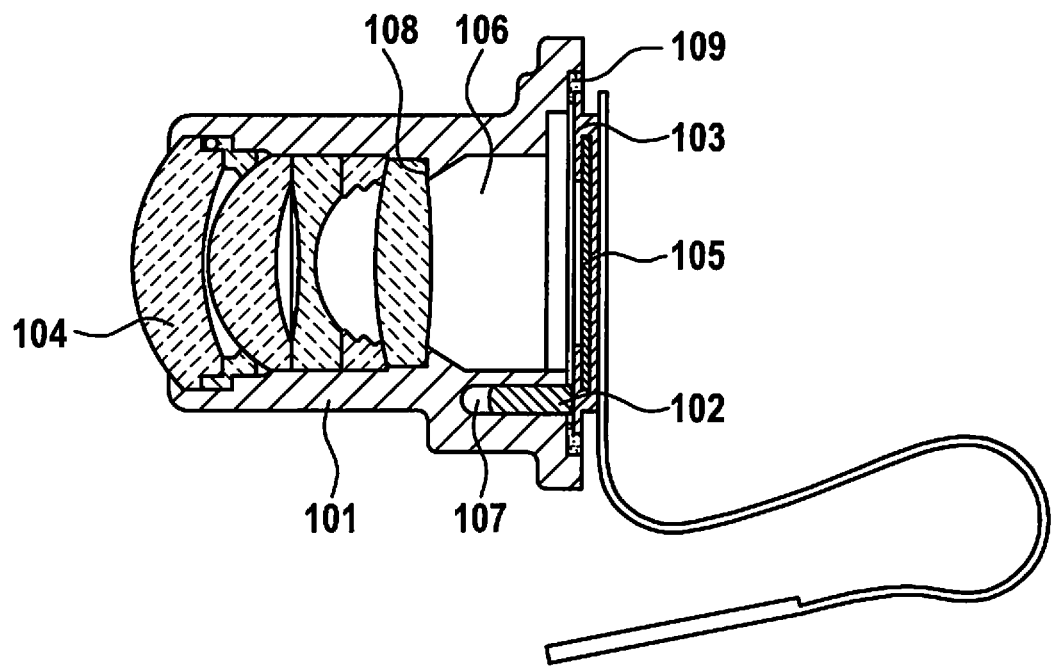
FIG. 1 shows an exemplary configuration of a device according to the present invention.

FIG. 1 shows the exemplary configuration of one of the devices according to the present invention.

In interior 106, housing 101 has a fixed installation space 108 for accommodating at least one optical component 104. It also features an outer receiving recess 107 that is spatially separate from interior 106 of housing 101. This receiving recess is realized as a hollow space in this example. Herein, however, receiving recess 107 is understood to be any structure where any desired positioning element 102 may be mounted; it being understood that these also include click systems, for example, thus receiving recesses 102 in which a positioning element 102 may be fixed in position by engagement. This type of outer receiving recess may also be laterally installed on housing 101.

In the exemplary embodiment, a plurality of optical components 104 are installed in fixed installation space 108.

Figure 3:
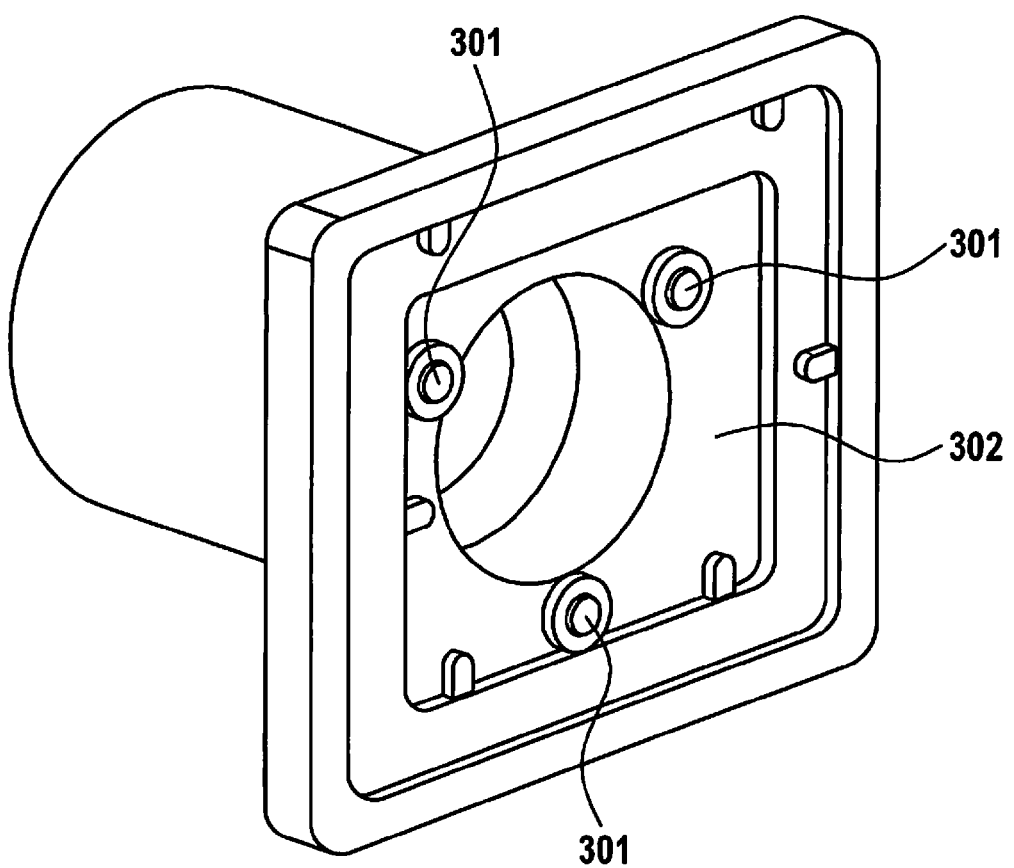
FIG. 3 shows an exemplary configuration of the housing including three positioning elements.
Figure 4:
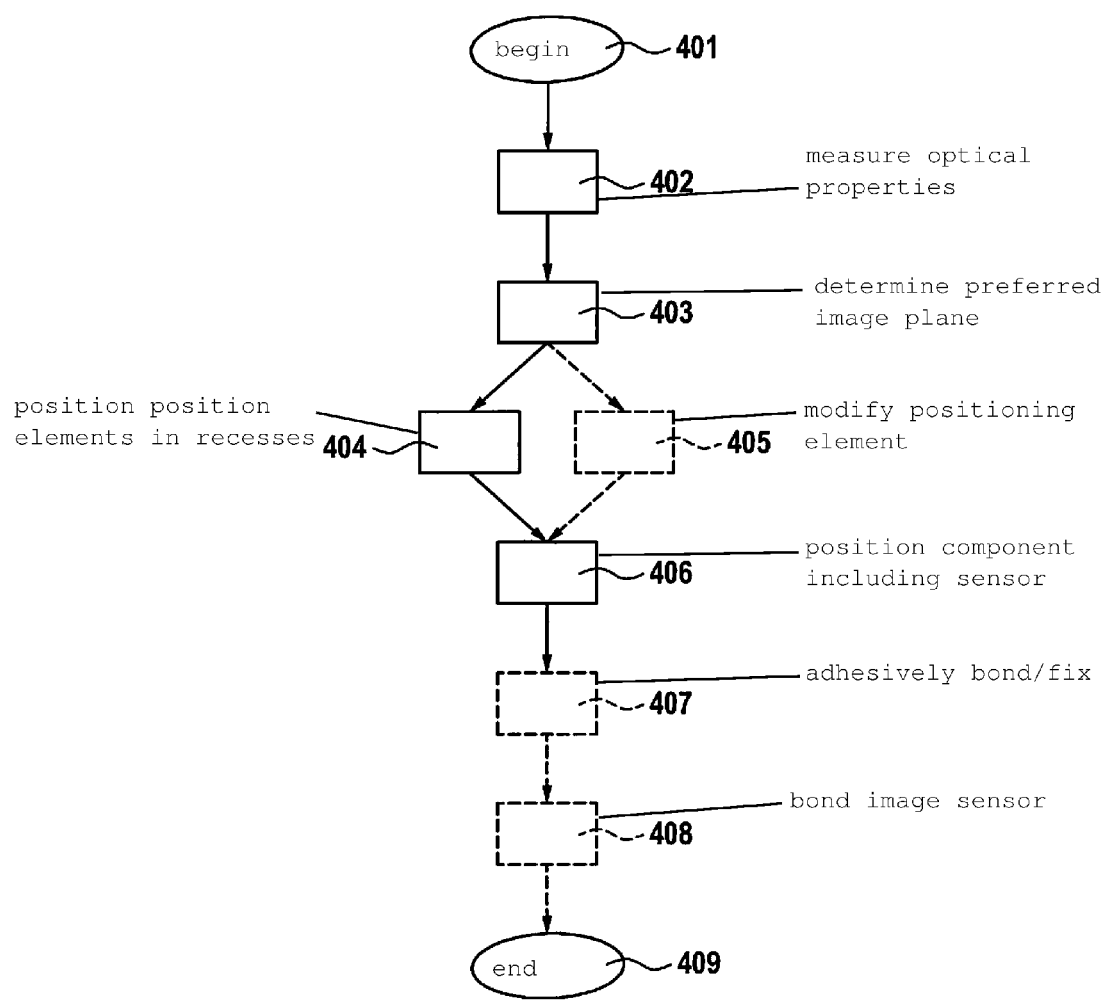
FIG. 4 shows the schematic sequence of the method for positioning the component that includes the image sensor.
Figure 5:
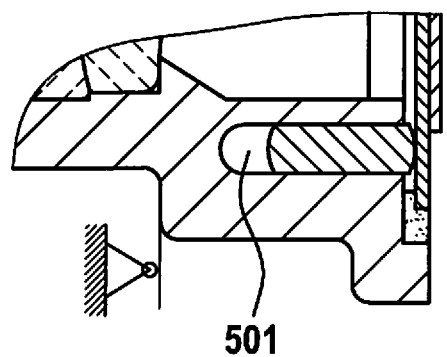
FIG. 5 shows exemplary variants of the outer receiving recess.
Figure 5:
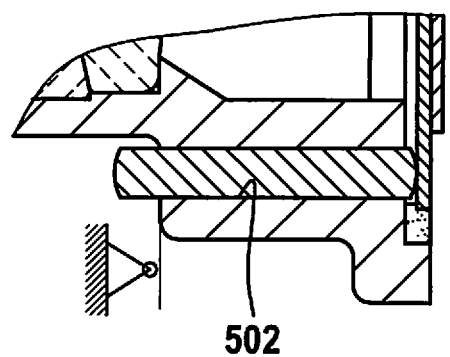

A positioning element 102 is placed in outer receiving recess 107. Together with two further positioning elements 301, which are more clearly illustrated in FIG. 3, this positioning element 102 defines a support plane. This support plane was defined in a way that allows image sensor 105 to be positioned in a preferred image plane 201 following the mounting of component 103 that includes image sensor 105.

Figure 2:
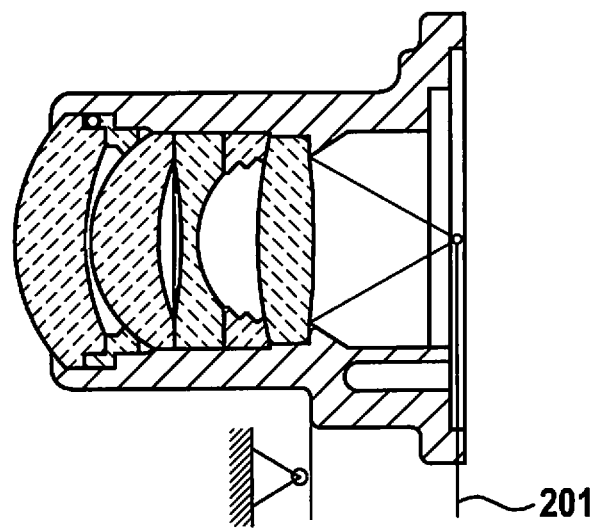
FIG. 2 shows an exemplary configuration including a visual representation of the preferred image plane.

As is discernible in FIG. 2, component 103 including image sensor 105 resides on the three positioning elements 102. To seal the interior, the exemplary embodiment provides that component 103 including image sensor 105 be adhesively bonded to housing 101 in a material-to-material bond. Adhesive bonds 109 prevent dirt particles from penetrating into interior 106 of housing 101.

Presented exemplarily is a method for assembling a camera system of the type under discussion and for properly positioning component 103 including image sensor 105.

An objective housing 101 is provided having at least one permanently installed optical component 104 that is secured in the interior of housing 106 at fixed installation space 108 provided for that purpose. In addition, housing 101 has an outer receiving recess 107 that is mounted spatially separately from interior 106 of housing 101.

The method for mounting component 103 including image sensor 105, whose aim is to position image sensor 105 in preferred image plane 201, includes the following steps:

The method begins in step 401. The optical properties of the at least one optical component 104 are measured in step 402 with the aid of current optical methods, such as "active alignment," for example. This is accomplished by directing beams of light through the at least one optical component 104 and by positioning and shifting an image sensor at the other end of optical component 104 in a way that allows the light-sensitive regions of image sensor 105 to be illuminated with varying intensity as a function of the position thereof. Thus, current mathematical methods are used to determine the position of the image sensor, so that it resides in an image plane to be regarded as optimal, and, averaged over the entire illuminating/light-active surface, has the best possible focus properties and thereby delivers the best possible image relative to the task at hand.

On the basis of this measurement, step 403 provides that the preferred image plane be determined in which an image sensor 105, which is to be mounted, is able to deliver the best possible performance under the condition that a specific region in the object field is to be sharply imaged. For this purpose, the geometric position of the plane is determined relative to the housing or at least relative to an optical element.

In step 404, positioning elements 102 are positioned in outer receiving recesses 107 in away that allows positioning elements 102 to define a support plane, taking into consideration the previously determined, preferred image plane 201 and component 103 including image sensor 105. Accordingly, the support plane is defined in a way that allows image sensor 105 to reside in the previously determined, preferred image plane 201 following placement of component 103 that includes image sensor 105. For this purpose, it is necessary to also take into consideration the geometry of component 103 including image sensor 105, respectively the position of image sensor 105 relative to component 103 including image sensor 105.

In the exemplary embodiment, outer receiving recess 107 is realized in a way that allows pin-shaped positioning elements 102 to be fastened in outer receiving recess 102 by press fitting thereof at any desired location, whereby different support planes are able to be defined as a function of this location.

In step 406, component 103 including image sensor 105 is positioned on the positioning elements, so that image sensor 105 resides in preferred image plane 201. This is initially accomplished by simply placing component 103 including image sensor 105 on positioning elements 102.

The plane surface on component 103 including image sensor 105 enables it to laterally shift image sensor 105 in a way that allows image sensor 105 to be oriented to image a desired image area in the best way possible. Image sensor 105 is preferably positioned in a way that allows the light that is focused by the at least one optical element 104 to strike in the optically active region of image sensor 105.

In an optional step 407, component 103 including image sensor 105 may be adhesively bonded to positioning elements 102 with the aid of an adhesive bond and thereby fixed in position. Instead of adhesive bonding, the various parts may also be fixed in position in different ways.

A further optional step 408 provides that component 103 including image sensor 105 be able to be adhesively bonded in the edge region thereof to housing 101 in order to seal interior 106, so that adhesive bond 109 protects interior 106 of housing 101 from dirt particles. This sealing may also be alternatively realized using silicone, for example, or by deforming the material of housing 101 or of the component including image sensor 105.

The method ends in step 409 and may be run through again, for example, in another optical system using a device according to the present invention.

Employing this method makes it possible for unpackaged sensors to be used. These are understood to be sensors that do not feature any additional shielding against dirt contamination, for example, since no particles are released in the interior of housing 101 during positioning of positioning elements 102, as could occur, for example, upon adaptation of support plane by a press fitting in interior 106 of housing 101 or upon introduction of an objective lens into interior 106 of housing 101 via a thread.

Alternatively to housing 101 used in FIG. 1, a housing 302 may also be used where the at least one positioning element 301, respectively in the exemplary embodiment, the three positioning elements 301 are already fixedly mounted on housing 302, and, in this case, housing 302 does not have any outer receiving recesses 107 for receiving positioning elements 102.

Already preinstalled positioning elements 301 may be made from the same material as housing 302, for example. As a result, entire housing 302, including positioning elements 301, may be fabricated in a casting process, for example.

To define the support plane, the orientation of the at least one positioning element 301 may be modified in an alternative step 405 in a way that allows the support plane, which is formed by a flat region of the one positioning element 301, upon which component 103 including image sensor 105 is placed, to define the desired support plane.

In the case of a plurality of positioning elements 301, the support plane is defined by the orientation of the regions of positioning elements 301, upon which component 103 including image sensor 105 is placed.

Various methods may be used to adapt the orientation of the at least one positioning element 301. For example, positioning element 301 may be brought into a specific position by bending or be adapted by the removal of material.

In these approaches, positioning element 301 may be mechanically reduced in size by cutting processes, for example. Alternatively, the at least one positioning element 301 may be oriented by using a laser to remove material, for example.

In this exemplary embodiment, component 103 including image sensor 105 is designed to feature plane structures in the region of the contact between component 103 including image sensor 105 and the at least one positioning element 301. This means that positioning elements 301 do not have to be mounted at a fixed position on component 103 including image sensor 105, rather that an attachment region is provided. This makes it possible for component 103 including image sensor 105 to be laterally shifted in a way that allows image sensor 105 to reside at the desired position.

The distance of preferred image plane 201, respectively of the support plane relative to housing 101, respectively to an optical component 104 is determined by the positioning of positioning elements 102.

Since the support plane is not predetermined by the housing geometry, inclined contact planes may also be realized relative to any desired end face of housing 101.

What is claimed is:

1. A housing for mounting a component that includes an image sensor, the housing comprising:
   a fixed installation space provided in an interior of the housing for accommodating at least one optical component including a lens, wherein the housing is configured to directly support and directly contact the lens;
   at least one outer receiving recess, spatially separate from the interior of the housing, for receiving at least one positioning element in a way that allows the positioning element to define a support plane relative to the housing, and so the component including the image sensor placed on the positioning element resides in the defined support plane, so that no direct contact results between the component that includes the image sensor, and the housing;
   wherein the housing, including the fixed installation space and the at least one outer receiving recess, is a one-piece cast part.

2. The housing as recited in claim 1, wherein the housing has at least three outer receiving recesses.

3. The housing as recited in claim 1, wherein the at least one outer receiving recess is one of a cavity or a through-extending opening at a location of the housing.

4. A device for mounting a component that includes an image sensor, comprising
   a housing, a fixed installation space for accommodating at least one optical component including a lens being provided in an interior of the housing, wherein the housing is configured to directly support and directly contact the lens; and
   at least one positioning element;

wherein the housing has at least one outer receiving recess that is spatially separate from the interior of the housing that is provided for receiving the at least one positioning element in a way that allows the positioning element to define a support plane relative to the housing, and so that the component including the image sensor when placed on the positioning element resides in the defined support plane, and there is no direct contact between the component that includes the image sensor, and the housing;

wherein the housing, including the fixed installation space and the at least one outer receiving access, is a one-piece cast part.

5. The device as recited in claim 4, wherein the device additionally includes at least one optical component that is fixedly mounted in the interior of the housing at the fixed installation space provided for at least one optical component.

6. The device as recited in claim 4, wherein three positioning elements are used, the three positioning elements being three pin-shaped positioning elements having rounded ends.

7. The device as recited in claim 4, wherein a position of the at least one positioning element is variable relative to the outer receiving recess.

8. The device as recited in claim 4, wherein the device further comprises the component including the image sensor, the component including the image sensor being situated on the positioning element, the image sensor having a plane supporting surface where contact to the at least one positioning element is provided.

9. A method for mounting a component that includes an image sensor, the method comprising:
providing a housing, a fixed installation space being provided in the interior of the housing for accommodating at least one optical component including a lens, the at least one optical component being fixed in position in the housing, the housing directly supporting and directly contacting the lens;
providing at least one positioning element, the at least one positioning element being at least one of: (i) mounted separately from the interior of the housing, and (ii) can be mounted at at least one outer receiving recess of the housing that is separate from the interior of the housing;
providing a component that includes an image sensor;
measuring optical properties of the at least one optical component;
based on the measuring, designating a preferred image plane in which the image sensor is to be mounted relative to at least one of: (i) a mechanical reference on the housing, and (ii) the optical component;
at least one of: i) adapting the at least one positioning element in a way that allows a support plane to be defined, taking into consideration the preferred image plane and the component including the image sensor, and ii) mounting the at least one positioning element on the at least one outer receiving recess in a way that allows a support plane to be defined, taking into consideration the preferred image plane and the component including the image sensor; and
mounting the component that includes the image sensor on the at least one positioning element in a way that allows the image sensor to reside in the preferred image plane;
wherein the housing, including the fixed installation space and the at least one outer receiving access, is a one-piece cast part.

10. The method as recited in claim 9, wherein the component including the image sensor is joined in a further step to the at least one positioning element in a material-to-material bond.

11. The method as recited in claim 9, wherein the component including the image sensor is joined in a further step to the housing in a way that allows an intermediate space between the housing and the component including the image sensor to be closed by form-locking engagement or by a material-to-material bond.

12. The method as recited in claim 9, wherein the component that includes the image sensor is mounted in such a way that no direct contact results between the component that includes the image sensor, and the housing.

* * * * *